United States Patent [19]

Sadovsky

[11] Patent Number: 5,689,638
[45] Date of Patent: Nov. 18, 1997

[54] METHOD FOR PROVIDING ACCESS TO INDEPENDENT NETWORK RESOURCES BY ESTABLISHING CONNECTION USING AN APPLICATION PROGRAMMING INTERFACE FUNCTION CALL WITHOUT PROMPTING THE USER FOR AUTHENTICATION DATA

[75] Inventor: Vladimir Sadovsky, Kirkland, Wash.

[73] Assignee: Microsoft Corporation, Redmond, Wash.

[21] Appl. No.: 355,401

[22] Filed: Dec. 13, 1994

[51] Int. Cl.$^6$ ..................................................... G06F 13/00
[52] U.S. Cl. ............... 395/188.01; 395/186; 395/200.09; 395/200.12; 395/609; 380/3; 380/4; 380/23; 380/25
[58] Field of Search ................... 379/67; 380/4, 380/21, 3, 23, 25; 395/200.09, 700, 186, 188.01, 200.12, 609

[56] References Cited

U.S. PATENT DOCUMENTS

| | | | |
|---|---|---|---|
| 5,241,594 | 8/1993 | Kung | 380/4 |
| 5,321,840 | 6/1994 | Ahlin et al. | 395/700 |
| 5,347,632 | 9/1994 | Filepp et al. | 395/200.09 |
| 5,402,490 | 3/1995 | Mihm, Jr. | 380/21 |
| 5,465,290 | 11/1995 | Hampton et al. | 379/67 |

OTHER PUBLICATIONS

"Examining Peer–To–Peer Connectivity in Chicago", by Adrian King, Microsoft Systems Journal, vol. 9, Nov. 1994.
"Chapter 5: Security Control Enhancements", Windows for Workgroups Software Developers Kit (SDK).
Microsoft White Paper: Windows for Workgroups 3.11, Architecture highlights.
Frank Jr. Derfler, "Windows for Workgroups", PC Magazine, v11 n21, p.255 (6) Dec. 8, 1992.
Edward Liebing, "NET.CFG settings depend on Netware version", LAN Times, v10 n10, p37 (2) May 24, 1993.

*Primary Examiner*—Thomas C. Lee
*Assistant Examiner*—Po C. Huang
*Attorney, Agent, or Firm*—Klarquist Sparkman Campbell Leigh & Whinston, LLP

[57] ABSTRACT

A method and system for providing access to independent network resources. At system logon, logon data is stored in memory of a client computer. When a server is accessed, server authentication data is stored in a cache. System logon data and authorization data can be applied to access an independent server resource without requiring user interaction.

13 Claims, 4 Drawing Sheets

Microfiche Appendix Included
(2 Microfiche, 123 Pages)

| SERVER NAME | PASSWORD | USER NAME |
|---|---|---|
| SERVER A | 0 | 0 |
| | | |
| | | |
| | | |
| | | |
| | | |
| | | |
| | | |
| | | |
| | | |

*FIG. 4*

METHOD FOR PROVIDING ACCESS TO INDEPENDENT NETWORK RESOURCES BY ESTABLISHING CONNECTION USING AN APPLICATION PROGRAMMING INTERFACE FUNCTION CALL WITHOUT PROMPTING THE USER FOR AUTHENTICATION DATA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but, otherwise, reserves all copyright rights whatsoever.

MICROFICHE APPENDIX

This specification includes microfiche Appendix A having 2 sheets with 123 frames, hereby expressly incorporated by reference for all purposes.

FIELD OF THE INVENTION

The invention relates to computer networks, and more specifically to access to independent resources on a computer network.

BACKGROUND OF THE INVENTION

Computers are often interconnected in a network to enable a number of computers to communicate and share resources. Networks can range in size from a small local area network, consisting of a few computers, printers, and other devices, to a much larger network consisting of many small and large computers distributed over a vast geographic area. A local area network or LAN commonly includes a number of personal computers and shared resources such as laser printers and large hard disks. Allowing the computers and other devices in the network to communicate, a communication link such as coaxial or fiber optic cable ties network devices together.

The client-server model is a widely used network architecture for local area networks. Both the client and server are intelligent, programmable computer systems: the client is typically a stand-alone personal computer for running user-oriented application programs, and the server is another personal computer or more powerful computer system providing data management, information sharing among clients, and network administration and security features. The server is in charge of managing access to shared resources such as a printer, a collection of files in a disk directory, or a communications device such as a fax or a modem.

In many client-server networks installed today, the network includes a number of completely independent server resources. "Independent" in this context means that the network resource has an independent, as opposed to shared, authentication database. In such a network, users have to enter authentication information such as a user identification (user ID) and password to access an independent network resource. This form of security is essential in computer networks to prevent unwanted access to a computer network. However, in networks including a number of independent servers, the process of accessing a given resource can be time consuming and disruptive to the user.

In the past, easy access to server resources was not a significant concern. User's usually only needed access to one or two servers every time they logged on to a network. Access to the server or servers, in this case, could easily be handled during the logon procedure conducted when a user started up his or her computer and connected to the network.

As networks and network technology have grown, it is not unusual for a user to access many different independent servers. To complicate matters, the user is less likely to always need access to the same servers, so it is not possible to predict which server resources a user will need access to. A current trend in computer networks is "peer-to-peer" capability where each computer in a network may act as a server. Since peer-to-peer networks significantly increase the number of servers a user can potentially access, easy access to each "server" is essential.

Another important feature for networks is a network browsing feature which enables a user to selectively browse a network or series of networks to look for resources. This feature also requires access to be simple and transparent to the user. The alternative is to require the user to repeatedly enter user authentication information for each server just to browse for server resources.

One solution to the problem of accessing servers is to enhance the network server or network operating system software to allow for a centralized logon. To support a centralized logon, the network includes a server for handling logon for all users. Once a user has logged in through the central logon procedure, the user obtains a special key to access additional server resources. Access is "transparent" to the user and is handled entirely behind the scenes.

Unfortunately, the centralized logon solution requires an expensive upgrade in the server software, and therefore is not a viable solution for many existing network users. For the great number of those who will continue to use their existing server software, there must be a less costly, yet equally effective alternative.

SUMMARY OF THE INVENTION

To address these drawbacks associated with independent server resources, the invention provides a method and system for providing access to independent network resources. In one embodiment, the system and method for accessing independent network resources are implemented in a network subsystem loaded into a client computer system. The networking subsystem includes a multiple provider router supporting common networking functions and presenting a networking interface to application programs. The multiple provider router communicates with a network provider responsible for accessing a particular network type. When an application such as an operating shell program makes a request to access network resources, the multiple provider router routes the request to the appropriate network provider.

The networking subsystem minimizes user interaction required to access a network resource. In this embodiment, the networking subsystem includes a cache for storing authentication data, and it also maintains logon data from system logon. To access an independent server, for example, a network provider applies logon data stored in the local computer where it resides. If this does not succeed, the network provider searches the cache for authentication data. If the authentication data for the server to be accessed is in the cache, then this data is applied to access the server. Only if both of these attempts fail is the user prompted to enter authentication information. Using this method, access to independent resources usually occurs without requiring user intervention.

The invention is useful in networks that treat servers as independent resources. In such systems, it is difficult to support a browsing feature because of the problem of authenticating access to the independent servers. The problem is even worse in systems where many computers can act as a server because the number of accessible servers increases. The invention solves this problem by performing authentication automatically and with minimal user interaction.

Further advantages and features of the invention will become apparent to those skilled in the art from the following description and accompanying drawings.

DETAILED DESCRIPTION

Figure 1:
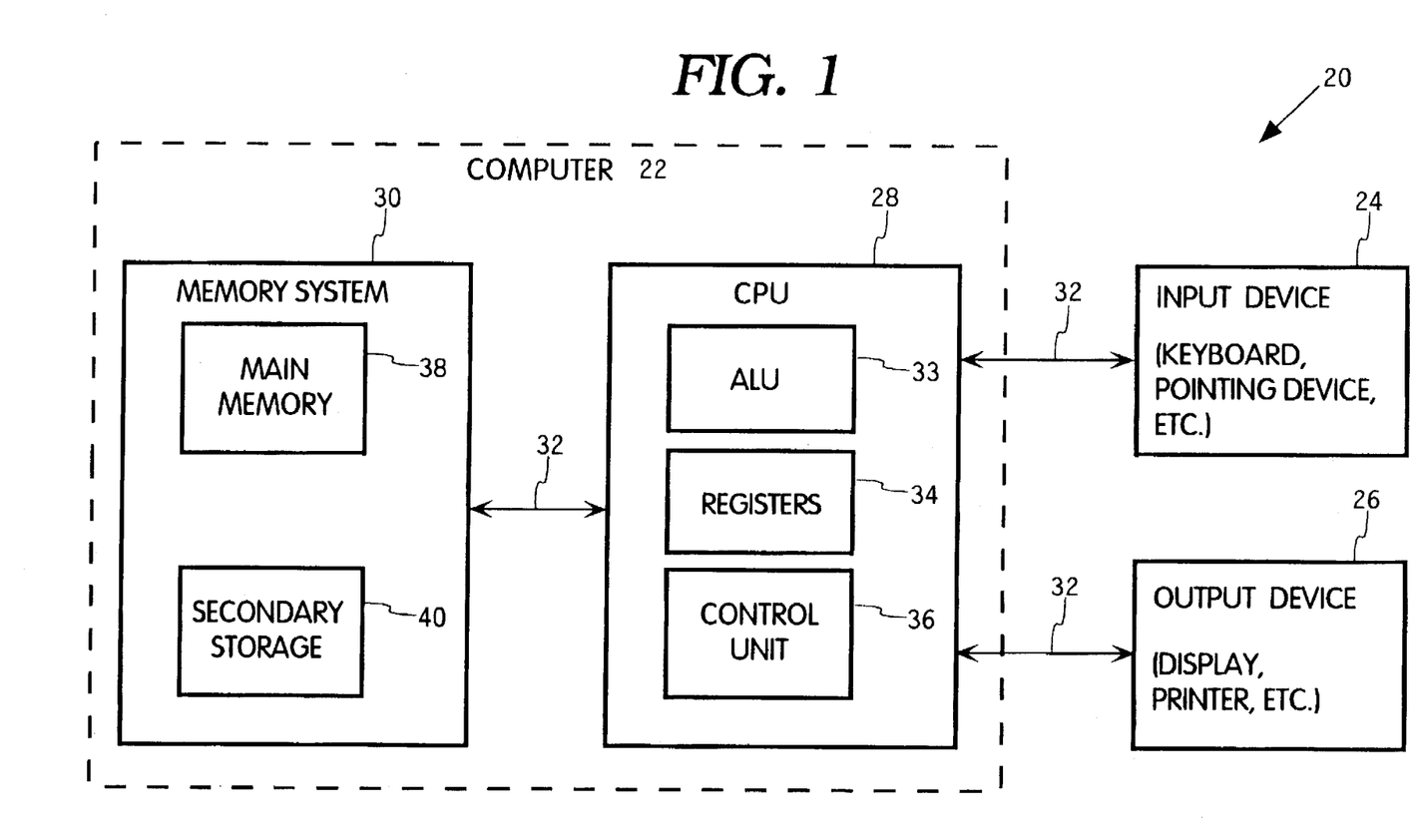
FIG. 1 is a block diagram of a computer system where a networking subsystem according to an embodiment of the invention may be implemented.

FIG. 1 is a block diagram of a computer system 20 which is used to implement a method and system embodying the invention. In a computer network adhering to the client-server model, both the client and server systems can have the same basic architecture as computer system 20. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

To enable the computer system to communicate with other computers in a network, the computer system includes a network adaptor. Allowing the computer to transfer data through the network, the network adaptor serves as both an input and output device 24, 26 for the computer system. The network adapter is typically an expansion card coupled to an expansion bus 32 of the computer system 20. Alternatively, the network adaptor could be another type of peripheral device such as a PCMCIA (Personal Computer Memory Card International Association) network adaptor. The type of network adaptor also varies depending on the network topology (i.e. a bus, ring, or star configuration), the data transfer medium (i.e. a coaxial cable, twisted pair, or fiber optic cables), and the vendor of the device. These network adapters are readily available and are well known in the computer industry.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

A computer network can include a variety of different computers and additional devices such as network printers and modems. In a client-server architecture, personal computers can act as both clients and servers in the network. In addition, larger computers such as minicomputers or mainframes can also act as either clients or servers. A personal computer can function as a controller of a disk array. A disk array is a special kind of server that uses a large portion of its processing power to manage input/output (I/O) for a large collection of disk drives. A personal computer can also act as a communication server, controlling access to a shared modem. A server typically performs such tasks as managing network traffic and storing common programs or data used by many on the network. With increases in computing power and storage, the distinction between a client and server becomes less important because most if not all computers in a network can function as both a client and server.

As outlined in the background section, some networks treat servers as independent network resources. This presents a problem to users and application developers because of the requirement that authentication information be applied every time an application needs to access a network resource. Authentication information is the data used to gain access to a network resource and is used to provide security against unwanted access to network resources. The authentication information usually includes a password and user identification (user ID), but can be of some other form. The invention solves the problems posed by the authentication process by providing a method and system for accessing independent resources.

Figure 2:
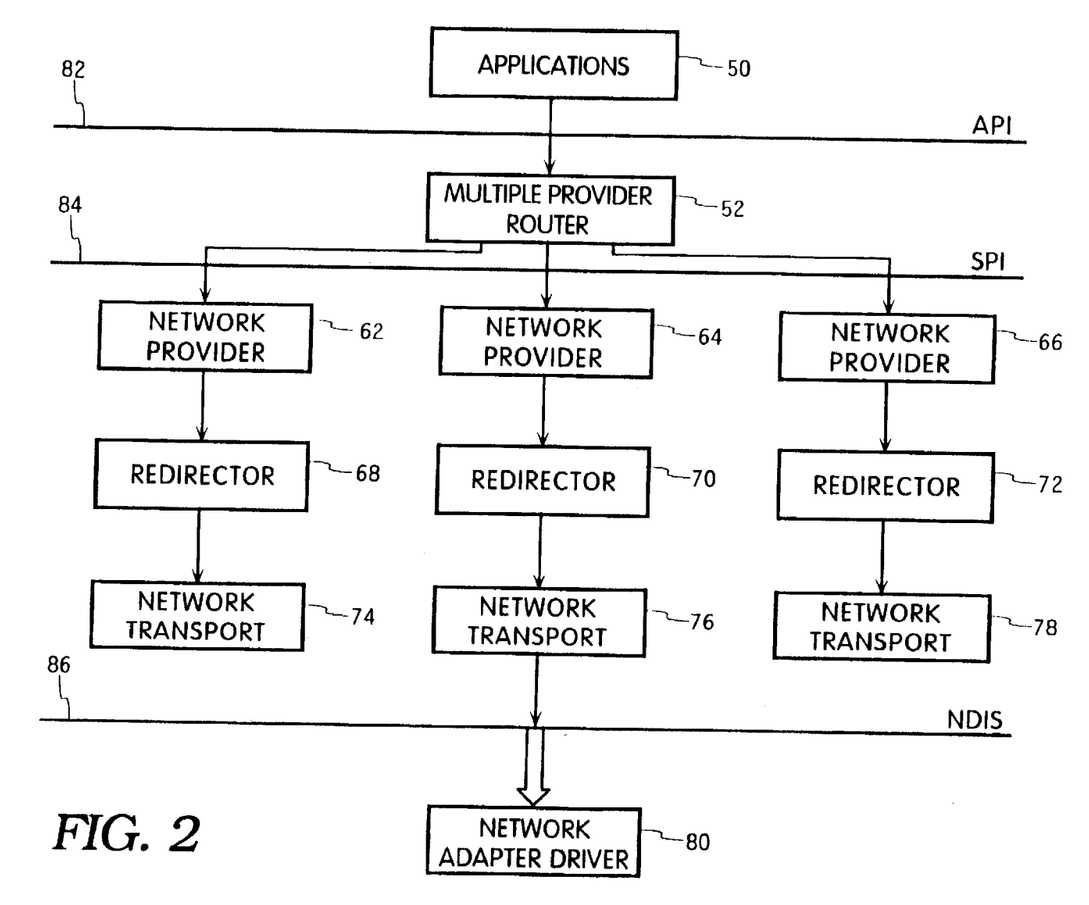
FIG. 2 is a block diagram of the architecture of a networking subsystem according to an embodiment of the invention.

FIG. 2 is a block diagram of the architecture of a networking subsystem in which an embodiment of the invention is implemented. When loaded into memory of a client computer system, the networking subsystem enables application programs 50 (including an operating system shell program) to access one or more networks. The networking subsystem includes a multiple provider router 52, one or more network providers 62, 64, 66, a redirector 68, 70, 72 associated with each network provider, a network transport 74, 76, 78 associated with each redirector, and a network adapter driver 80.

The networking subsystem illustrated in FIG. 2 is merely one example of an architecture where the invention may be implemented. This networking subsystem is an example of a networking subsystem that can be incorporated into the Windows 95 operating system from Microsoft Corporation. It should be understood that the invention is not limited to this particular subsystem architecture.

The multiple provider router 52 provides a common network interface for applications 50. The multiple provider router 52 is a dynamic link library (DLL) that includes code to support a network application programming interface (API) 82. The multiple provider router 52 avoids duplication of code needed to support multiple networks by implementing common network functions in a single DLL. Since the multiple provider 52 is a DLL, it can be shared by application programs 50, including an operating system shell program. The multiple provider router 52 provides an interface to applications 50 that allows for seamless browsing of network resources into authenticated information such as network directories, printers and other network resources. From the perspective of the application, the multiple provider router 52 provides consistent handling of authentication requirements across multiple networks.

Applications perform network related functions using the networking API 82. The networking API includes functions to create and break a network connection, enumerate network resources, report errors, access a password cache for storing and prompt a user for authentication information. While the multiple provider router initially processes all network APIs, it also may route some APIs to the appropriate network provider module. The networking API 82 is set forth in more detail in the "Win32 Networking API Specification," attached as Appendix A.

The networking subsystem shown in FIG. 2 can support a number of different networks by including a number of network providers compatible with the service provider interface (SPI) 84. For a detailed specification of the SPI, see the "Chicago/Win32 Network Provider SPI Specification" attached as Appendix A. The SPI 84 includes a series of functions implemented in the network providers 62, 64, 66 to support a network. To access functionality provided in a network provider, applications call functions in the networking API 82. The multiple provider router 52 then routes functions to the SPI 84 of the appropriate network provider 62, 64, 66. Features common to all networks are implemented once in the multiple provider router which reduces the code base of each network provider and insures common behavior between networks. Network specific functions are implemented in the network providers 62, 64, 66.

Each network provider is a dynamic link library which implements the SPI. It should be noted that network providers do not have to implement every function in the SPI, but rather can implement a subset of the functions. The SPI functions supported in a network provider include user identification, device redirection, shell interface, enumeration, authentication, and configuration functions. These SPI functions are set forth in more detail in Appendix A.

The device redirection functions are the target of the connection functions supported in the multiple provider router. See Appendix A at 9–16. They form the association between a network resource and a network resource's name such as a drive letter or a device name for a printer.

The shell interface functions help display the network layout and attached resources for the user. See Appendix A at 18–20. A specific function called the NPSearchDialog() function extends the shell browsing features by allowing a network provider to display its view of the associated network.

The enumeration functions are used by the network provider to support for network browsing. See Appendix A at 20–28.

The authentication functions enable the network provider to participate in network logon and logoff procedures controlled by the multiple provider router 52.

An advantage of the network providers 62, 64, 66 is that they share authentication information. This feature is useful, for example, to support browsing for resources among several networks. The network providers can share logon information including the user name and password used to access the local computer system where the network providers reside. Similarly, the network providers can share authentication information in a password cache, containing authentication information from previous connections to network resources.

Network software vendors can incorporate client support into this networking subsystem by developing a network provider compatible with the SPI 84. FIG. 2 provides an example of networking subsystem having three network providers 62, 64, 66, each supporting a separate network. In this embodiment, the support for providing access to independent server resources resides primarily in a network provider 62 called "NPNW.dll". As described in further detail below, the network provider, NPNW.dll 62, refers to a module for supporting a Novell NetWare Version 3 Network system. "NetWare 3" is the name of a version of network software product commercially available from Novell, Inc. The invention can also be applied in a variety of network systems where network resources are treated as independent resources. It should be understood that the invention is not limited to this implementation, but rather, extends to all networks where access to independent network resources poses a problem. In addition to the network provider, NPNW.dll, the networking subsystem can include additional network providers 64, 66 either from Microsoft Corporation or from other vendors.

The network providers 62, 64, 66 transfer data to and from the networks that they correspond to using a redirector 68, 70, 72. In general, redirection is the process of writing to or reading from a file or device different than the one that would normally be the target or the source. In the network context, the redirector controls the reading and writing of data to a remote filesystem or device. The redirectors in this subsystem redirect the unique semantics of a particular remote file system. Since the redirector is specifically written for a particular network, the redirector is typically provided by a network vendor. For example, for NetWare 3 network software from Novell, Inc., Novell provides a redirector and publishes an application programming interface to allow others to interface with it. For other types of networks such as Windows for Work Groups from Microsoft Corporation, the networking subsystems includes a compatible redirector.

The network transports 74, 76, 78 implement the device specific network transport protocols. The redirector calls upon the transport for the actual delivery and receipt of network data. Each redirector can use a separate transport. However, because the functions of the redirector and the transport are clearly separated in this networking subsystem, it is also possible to use more than one redirector for the same transport. Some examples of commercially available transport modules include NETBEUI available from Microsoft Corporation and IPX/SPX available from Novell. A variety of different network transports can be used, but they must be compatible with the corresponding redirector.

The network driver interface specification (NDIS) 86 is a vendor independent software specification that defines the interaction between any network transport and the underlying device driver. The NDIS 86 enables more than one transport 74, 76, 78 to use the same physical network adaptor 80 as the associated device driver.

The network adaptor 80 driver controls the physical network hardware such as the network adaptor card in the computer system 20. The network adaptor driver 80 cooperates with the network transports to send and receive data packets through the network. As is well known, their are number of commercially available adaptor drivers 80, and the particular version or type of driver is not critical to the invention.

Figure 3:
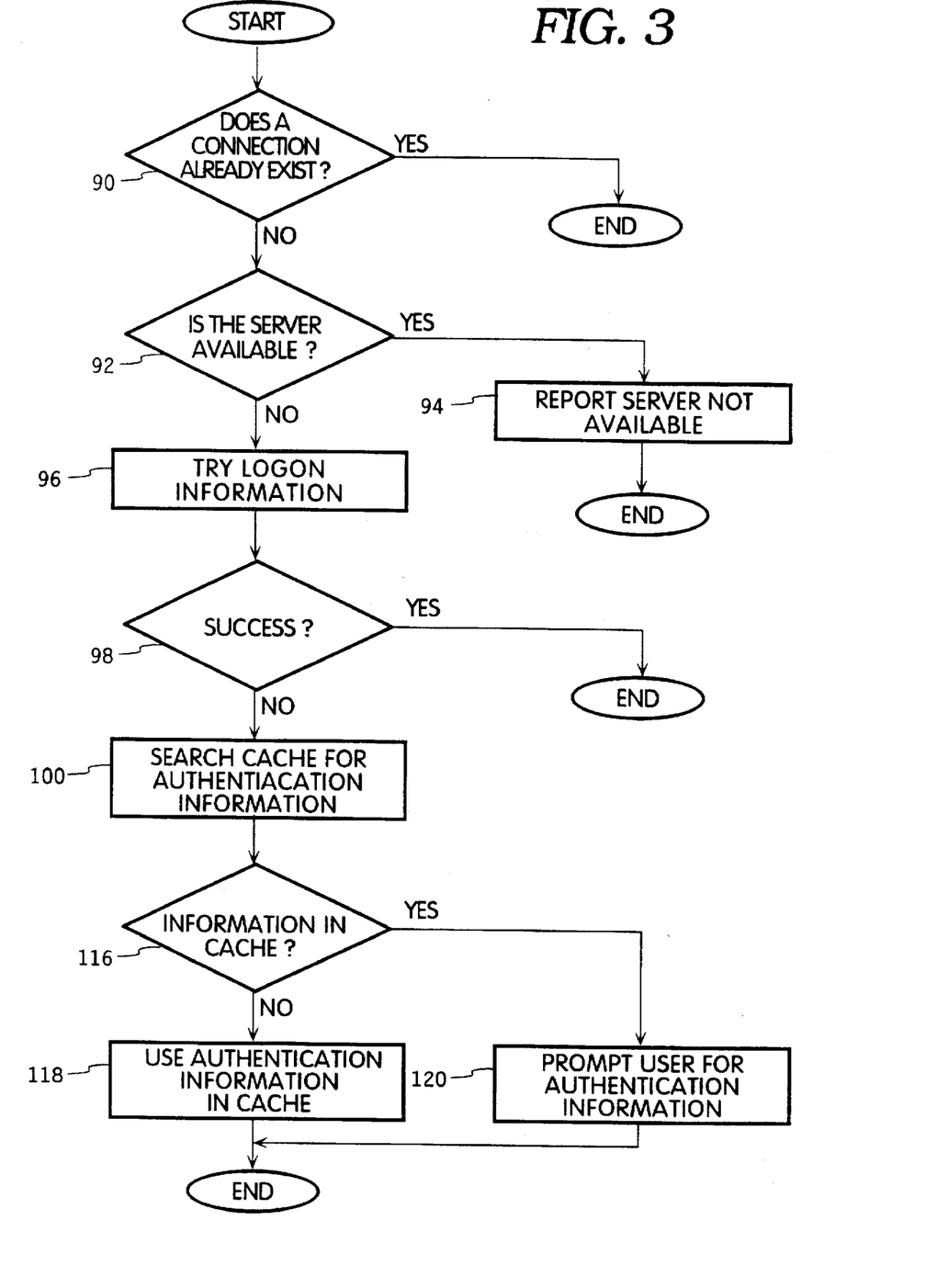
FIG. 3 is a flow diagram illustrating the steps of accessing an independent network resource according to an embodiment of the invention.

Having described the networking subsystem, it is now possible to describe a method for accessing independent network resources. FIG. 3 illustrates the steps of accessing an independent network resource according to an embodiment of the invention.

The process of accessing an independent network resource begins when an application or the shell requests access to a network resource. This occurs, for example, when browsing network resources or when an application seeks to connect to a specific network resource. First, the network provider determines whether a connection already exists (90). This step 90 is network specific, and therefore, is not necessarily required for each type of network. For a network provider that supports a NetWare 3 network, the network provider (NPNW.dll) 62 sends a request to the server to determine whether the client is already authenticated, meaning that a connection has been established between the client and server. If the connection already exists, the network provider 62 does not need to provide authentication information and the process of accessing the resource ends.

If a connection does not exist, the network provider 62 then determines whether the network resource to be accessed is available (92). The term, "available," means that the network resource is accessible through the network interface supported by the underlying redirector. For instance in a NetWare 3 network, a network server is available if the server to be accessed is active, supports the network core protocol (NCP), and is able to create a new connection. As to whether the server can create a new connection, some servers have a limit on the total number of connections they can support. As such, a server is "unavailable" if the number of connections is at this limit. If a network resource is not available, the network reports an error identifying that the resource is not available (94).

If the network resource is available, then the network provider attempts to access the server using logon information 96. The logon information includes the user name entered during master logon, and the password entered to log on to the local computer system. The logon information is stored in RAM, and more specifically, in the code space of the network provider 62. If the attempt to authenticate access to the server succeeds using the logon information (98), then the method of accessing the independent resource ends.

The logon information described above is merely an example of the type of information used in one implementation. Since different systems use different logon information, it should be understood that the logon information can vary without departing from the scope of the invention.

If the attempt to authenticate access to the server using logon information fails, then the network provider determines whether authentication information for the server is stored in a local password cache (100). The password cache is a data store for storing authentication information. The password cache stores authentication information for servers that have been accessed before. For example, if a user accesses a directory on a remote server on a NetWare 3 network, authentication information for that server will be cached. The next time the user needs to access that particular server, the authentication information stored in the password cache can be applied to access the server.

Figure 4:
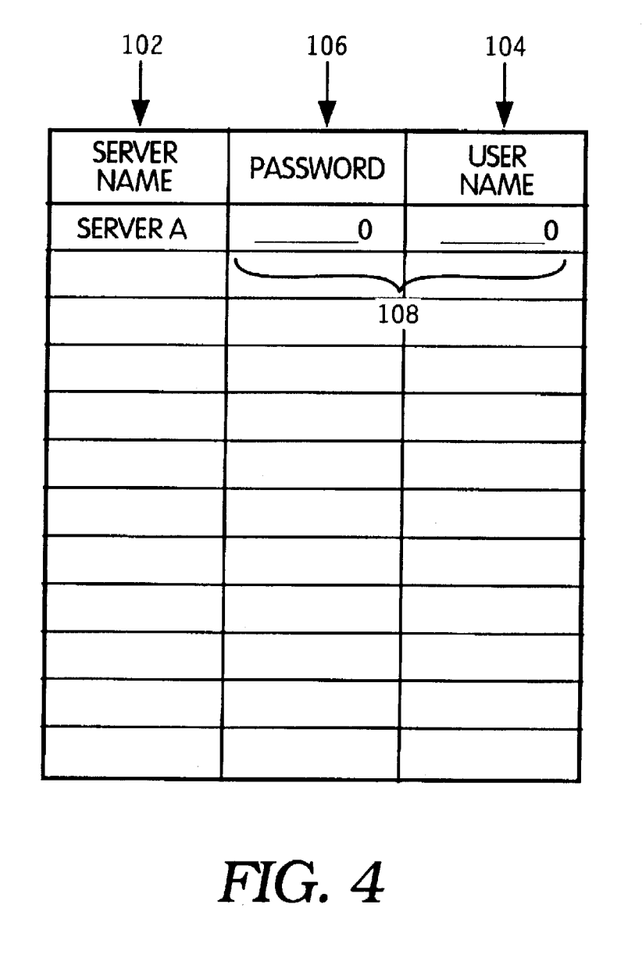
FIG. 4 illustrates the structure of the password cache according to an embodiment of the invention.

FIG. 4 illustrates the structure of the password cache 101. The password cache structure 101 includes a portion for identifying a server name 102, a user ID (104) and a password 106. In this particular implementation, the user name and password are located together in a string 108 separated by the null value, zero. It is not critical to the invention, however, whether the structure has separate fields for the user ID and password. The password cache 101 is maintained in main memory of the local computer system. At the user's option, the data in the password cache 101 can be written to secondary storage (e.g. the hard drive) of the local computer system. If additional security is desired, password caching can be disabled.

For security purposes, the password cache 101 is encrypted using the system logon user name or ID and password. When a user successfully logs on at his/her local computer system, the password cache is made available for use by the network providers 62, 64, 66 and application programs 50.

To determine whether the password cache 101 contains authentication information for the server to be accessed, the network provider searches the password cache 101 for the server name. If authentication information is stored for the server 116, the network provider uses the authentication information to connect to the server 118.

Alternatively, if the password cache does not have authentication information for the server, then the network provider must prompt the user for authentication information 120. The network provider can call the authentication dialog function to obtain information from the user. This service is described in Appendix B beginning at page 45.

In this manner, the networking subsystem provides access to independent network resources such that interaction with the user is minimized. The user only has to enter authentication information if both the logon data does not apply and the password cache does not include the necessary authentication data. A user can therefore browse for resources or request a connection to a remote printer, for example, without having to repeatedly enter authentication information.

The networking subsystem described above simplifies access to independent network resources for applications. An application, such as an operating system shell program, can use the AddConnection function to connect a server without specifying a specific device such as a printer or a drive letter corresponding to a file system entity. This enables the operating system to support a browsing feature. While browsing, the shell program can establish a connection to a server without specifying a device or file system entity, and the devices available on the server can be enumerated using the connection. The ability to create a connection to a server without specifying a device name can also simplify access to network resources for other applications. For instance, the shell program can be used to set up a connection to a server, and then other applications can access the server without having to support the authentication functions required to establish a connection.

In environments where security is critical, the process of accessing independent resources without user interaction can be disabled. To provide additional security, the user can be prompted for authentication information every time an independent network resource needs to be authenticated to establish a connection. In addition, the caching of authentication information can be disabled, so that use of authentication functions built into the networking subsystem cannot be used. By making the authentication functions optional, the administrator of the network make the network more secure if necessary.

Though the invention is described above with reference to a particular embodiment, it should be understood that many variations to the embodiment are possible without departing from the scope of the invention. For example, networking subsystem functionality could be implemented in a number of different network system architectures. It is preferable to implement common networking functions in a shared DLL, but this is not required. It is also preferable to implement the network providers in a DLLs according to a common service provider interface, but again, this is not required.

The method according to the invention may also vary without departing from the scope of the invention. For example, the steps could be performed in a different order: the authentication data in the password cache could be applied first before applying logon data to access a network resource. It is preferable to minimize information stored in the password cache, but the type of data and duration of storage can vary. The structure and manner of encrypting the cache can vary as well. Many other alternatives are possible.

In view of the many possible embodiments to which the principles of our invention may be put, it is emphasized that the detailed embodiments described herein are illustrative only and should not be taken as limiting the scope of our invention. Rather, I claim as my invention all such embodiments as may come within the scope and spirit of the following claims and equivalents thereto.

I claim:

1. In a programmed computer having a plurality of network providers for accessing remote network resources, where each of the network providers is associated with a distinct type of network software and each of the network providers manages connections between the computer and a computer network, a method for accessing independent network resources in a computer network, the method comprising:

storing logon data for a user when the user logs on to a local computer system in the computer network;

storing authentication data in an authentication data cache shared among the network providers when the network providers access an independent network resource;

in response to a request from an application program to enumerate network resources available at an independent network resource in a first network, checking whether a connection has been established to the independent network resource in the first network;

if the connection has not been established, executing a connection API function in response to a connection API function call from the application to establish the connection without prompting the user for authentication data including:

a) routing the the connection API function call to a network provider that manages connections with a network having the independent network resource;

b) using the network provider to authenticate access to the independent network resource without requesting authentication data from the user by searching for authentication data corresponding to the independent network resource in the authentication data cache and authenticating access to the independent network resource using the corresponding authentication data in the shared authentication data cache;

c) enumerating the network resources available at the independent network resource on the first network using the connection established with the independent network resource;

in response to a request from the application program to enumerate network resources available at an independent network resource at a second network, checking whether a connection has been established to the independent network resource in the second network; and if the connection has not been established, executing the connection API function in response to a connection API function call from the application to establish the connection without prompting the user for authentication data including steps a–c wherein the first and second networks run on different types of network software.

2. The method of claim 1 wherein the authentication data includes a user identification and a password.

3. The method of claim 1 wherein the authentication data is stored in a cache.

4. The method of claim 3 wherein the cache resides in main memory of the local computer system.

5. The method of claim 3 wherein the authentication data in the cache is encrypted using logon data.

6. The method of claim 1 wherein the attempting to access the independent network resource using the stored authentication data is performed only if the attempting to access the network resource using the stored logon data fails in accessing the independent network resource.

7. The method of claim 1 wherein the attempting to access the independent network resource using the stored logon data is performed only if the attempting to access the network resource using the stored authentication data fails in accessing the independent network resource.

8. The method of claim 1 including the step of:
   prompting the user to enter authentication data only if the attempting to access the network resource using stored logon data and stored authentication data fails.

9. A computer-readable medium having stored therein instructions capable of causing a computer to perform the method of claim 1.

10. A method for accessing independent network resources in a computer network with independent servers that do not share authentication data, the method comprising:

storing logon data for a user in main memory of a local computer system when the user logs on to the local computer system in the computer network;

storing a user name and password in a cache of the local computer system when a user accesses an independent server;

in response to a request from an application to enumerate network resources available at an independent server, checking whether a connection has been established to the independent server in the first network;

when the connection has not been established, executing a connection API function in response to a connection API function call from the application to establish the connection without prompting the user for authentication data including:

a) attempting to access the independent server using the stored logon data;

b) searching the cache in local memory for a server name associated with the independent server;

c) attempting to access the independent server using a user name and password stored in the cache and associated with the independent server;

d) if the attempting to access the independent server using the stored logon data and the stored authentication data both fail, then prompting the user to enter a user name and password after a connection is established with the independent server, enumerating network resources available at the independent server.

11. The method of claim 10 wherein the stored authentication data in the cache is encrypted.

12. The method of claim 11 wherein the stored authentication data in the cache is encrypted using logon data, and the cache in memory of a local computer system is accessible to user at the local computer system when logon data associated with the local computer system is entered in the local computer system.

13. A networking subsystem located in memory of a client computer system in a computer network, the networking subsystem for accessing network resources in the computer network, the network subsystem comprising:

a cache for storing logon data and authentication data;

a plurality of network providers, each associated with a distinct type of network and operable to establish a network connection between the client computer and the associated network, wherein each of the network providers is in communication with the cache for storing authentication data when a network resource on the associated network is authenticated, and for authenticating access to network resources in the associated network using the stored logon and authentication data before prompting a user to enter authentication data;

a multiple provider router providing a connection application programming interface (API) function and a browsing API function to application programs in the client computer and in communication with the application programs so that the application programs can invoke the connection API function to request a connection with a network resource, and in communication with the plurality of network providers for routing the request to the network provider associated with the network having the network resource, wherein the multiple provider router is in communication with the network providers for requesting an enumeration of network resources on the associated networks when an application program invokes the browsing API function; wherein the multiple provider router is in communication with each of the network providers to route a connection request to one of the network providers when an application invokes the connection API function; wherein each of the network providers are in communication with the cache and are operable to connect to the associated networks by searching the cache for authentication data corresponding to the network resource and using the corresponding authentication data to establish a connection in response to the connection request; and wherein each of the network providers are operable to return an identification of network resources on the associated networks in response to the request for enumeration from the multiple provider router; and a plurality of redirectors, each associated with one of the network providers, each of the redirectors in communication with the associated network provider for reading and writing data to a remote server or device.

* * * * *

UNITED STATES PATENT AND TRADEMARK OFFICE
CERTIFICATE OF CORRECTION

PATENT NO. : 5,689,638
DATED : November 18, 1997
INVENTOR(S) : Sadovsky

It is certified that error appears in the above-identified patent and that said Letters Patent is hereby corrected as shown below:

In the Drawings:

The bottom arrow of block 92 in Fig. 3 should read YES and the right arrow should read NO.
The bottom arrow of block 116 in Fig. 3 should read YES and the right arrow should read NO.

Column 1, line 67, "User's" should read --Users--.

Column 3, line 22, "invention," should read --invention.--.

Column 6, line 2, "to support for network" should read --to support network--

Column 6, line 54, "includes" should read --include--.

Column 7, line 11, "their are number" should read --there are a number--.

Column 9, line 10, "network make" should read --network can make--.

Column 9, line 63, "the the" should read --the--.

Signed and Sealed this

Eighth Day of September, 1998

Attest:

BRUCE LEHMAN

Attesting Officer

Commissioner of Patents and Trademarks